Oct. 30, 1934.        R. G. McBRIDE        1,979,202
QUIRKER
Filed Jan. 29, 1932
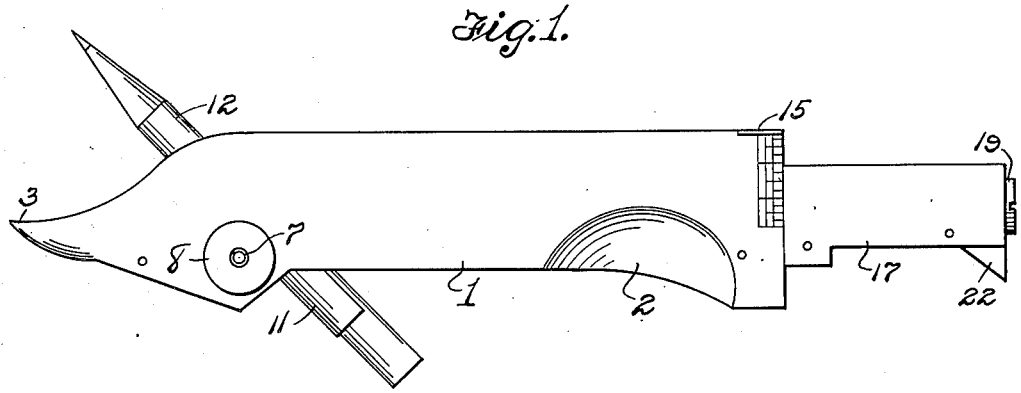
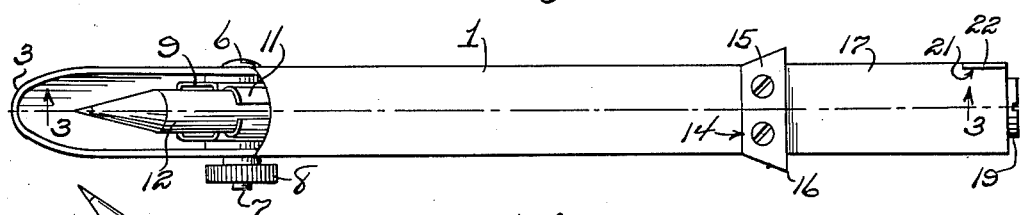
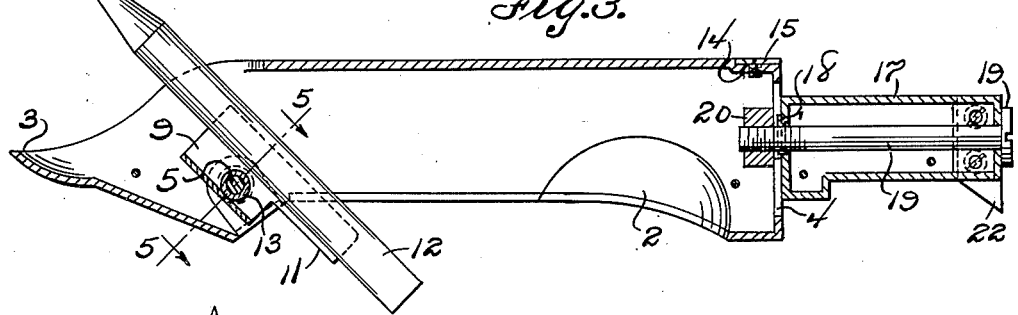
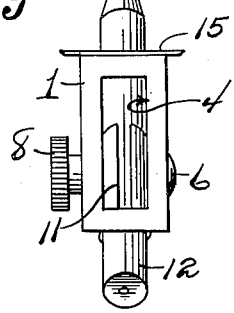
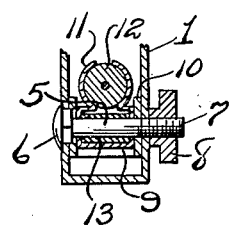
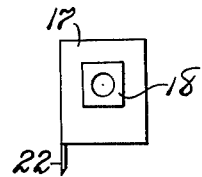
Robert Given McBride
INVENTOR
BY Victor J. Evans
and Co. ATTORNEY Patented Oct. 30, 1934

1,979,202

UNITED STATES PATENT OFFICE 1,979,202

QUIRKER

Robert Given McBride, Webb, Ariz.

Application January 29, 1932, Serial No. 589,709

1 Claim. (Cl. 33—42)

This invention relates to an instrument to be used for the purpose of making the proper quirk, or recess such as is made when the door or window casing is not being set flush with the jamb and where a quirk is desired. In use the quirker avoids the liability of inaccuracy in measurement and will give an accurate measurement from the point of being flush and to provide the recess at the required distance wanted.

The quirker is so constructed that it may be used for delineating all of the different markings necessary in fitting and setting the casing back any required distance, also in giving an accurate fit to the floor or other object that the casing or facing may fit upon, also a knife point on the front of the anvil for scribing a mark upon a board or other object which is to be cut.

In the accompanying drawing:—

Figure 1 is a side elevational view of the quirker.

Figure 2 is an edge elevational view of the quirker.

Figure 3 is a longitudinal sectional view thereof cut on the line 3—3 of Figure 2.

Figure 4 is an end view of the quirker with parts removed.

Figure 5 is a detailed sectional view cut on the line 5—5 of Figure 3.

Figure 6 is an end view of an anvil used upon the quirker.

As illustrated in the accompanying drawing the quirker consists of a body 1 which is preferably made from sheet metal, the body being hollow as best illustrated in Figure 3 of the drawing. The body 1 is provided at its opposite sides with concaved portions 2 which may receive the fingers of the operator when the quirker is being used for delineating marks upon a piece of work. The body 1 is provided at one end with a point 3 and at its opposite end with a slot 4. A bolt 5 passes transversely through the body 1 and the head 6 of the said bolt is held against rotation in one side of the body. The opposite end 7 of the bolt is threaded and a nut 8 is screwed upon the threaded end of the bolt and is adapted to bear against the other surface of one of the sides of the body 1 as best shown in Figure 5 of the drawing. A clamp member 9 is mounted upon the interemediate portion of the bolt 5 and washers 10 mounted upon the bolt bear against the end of the clamp member 9. The clamp member 9 is provided with jaws 11 adapted to receive a pencil 12 or other scribing instrument. A sleeve 13 is located upon the intermediate portion of the bolt 5 and when the nut 8 is tightened upon the thread 7 of the bolt 5 the washers 10 are brought in close contact with the ends of the clamp member 9 and the opposite ends thereof are forced against the ends of the sleeve 13 and the jaws 11 are forced tightly against the opposite sides of the pencil 12.

That end of the body 1 which is provided with the slot 4 is also provided at its edge with a recess 14 which receives a blade 15. The ends of the said blade project beyond the side of the body 1 and are pointed as at 16.

An anvil 17 is provided at one end with a lug 18 which fits in the slot 4. The anvil 17 is hollow as best shown in Figure 3 and a bolt 19 passes through the anvil and the slot 4 and a nut 20 is screwed upon the inner end of said bolt. The head of the bolt 19 bears against the outer end of the anvil and holds the anvil at an adjusted position after the bolt 20 has been tightened. A blade 21 is carried by the anvil and the said blade has an end portion which is disposed beyond the side of the anvil and pointed as at 22.

Let it be assumed that a door has been set ready for the casing. The first thing to do is to make the casing fit the floor, providing the casing is not square at the bottom end or the floor is not at a right angle with the jamb. The casing is placed against the edge of the jamb in a vertical position flush at the bottom and the top with the face of the jamb; the scriber points are set wide enough to cover all irregularity in the floor or casing giving room enough for a saw cut across the casing, the body point of the scriber is placed on the floor and by drawing the scriber across the board a mark is made by the pencil point parallel with the floor. The casing is cut off at the pencil mark, and is again set up perpendicular with the jamb, the anvil is then adjusted to the proper amount of quirk desired, the anvil is placed under the head jamb and pushed forward until the face of the body rests against the jamb, at this time the point on the body is resting against the casing which is setting flush with the jamb. The quirker is then drawn outwardly and at the same time pressing the anvil squarely against the head jamb and by doing so the cutter next to the casing makes a mark exactly the distance from the anvil which has been set down from the top of the quirker making the casing much longer from the bottom part of the head jamb. The casing is then lowered and squared to the mark made by the cutter and by using the cutter that is on the front of the anvil a laceration or mark is made in the wood as would be made by a knife blade and this mark gives the desired distance for the quirk. The operation is the same for both casings, first using either right or left hand and then vice versa which will have made use of both points on the edge of the quirker.

Now let it be assumed that the casing is to be nailed up. The nail is started and the casing is pressed firmly against the edge of the jamb, the anvil is pressed against the inside of the jamb with the face resting against the edge of the jamb, the casing is then pressed against the body of the quirker giving the right distance while the quirker is being nailed and by lowering or raising the quirker the proper distance at all nail points will be located.

Having described the invention what is claimed is:

A quirker comprising a hollow body with a longitudinal edge wall and an end wall arranged at right angles to each other, the end wall being formed with a slot in the direction of its length, an anvil disposed against the end wall, a screw extending longitudinally through the anvil and through the slot in the end wall, a nut mounted upon the inner end of the screw and bearing against the inner face of the end wall, whereby the anvil may be adjusted toward and away from the plane of the longitudinal edge wall, a blade seated upon the edge wall flush with the latter with one edge coincident with the edge of the end wall, the blade being extended laterally beyond the side faces of the body and terminating in points lying in the plane of the end wall of the body.

ROBERT GIVEN McBRIDE.